Patented Apr. 10, 1951

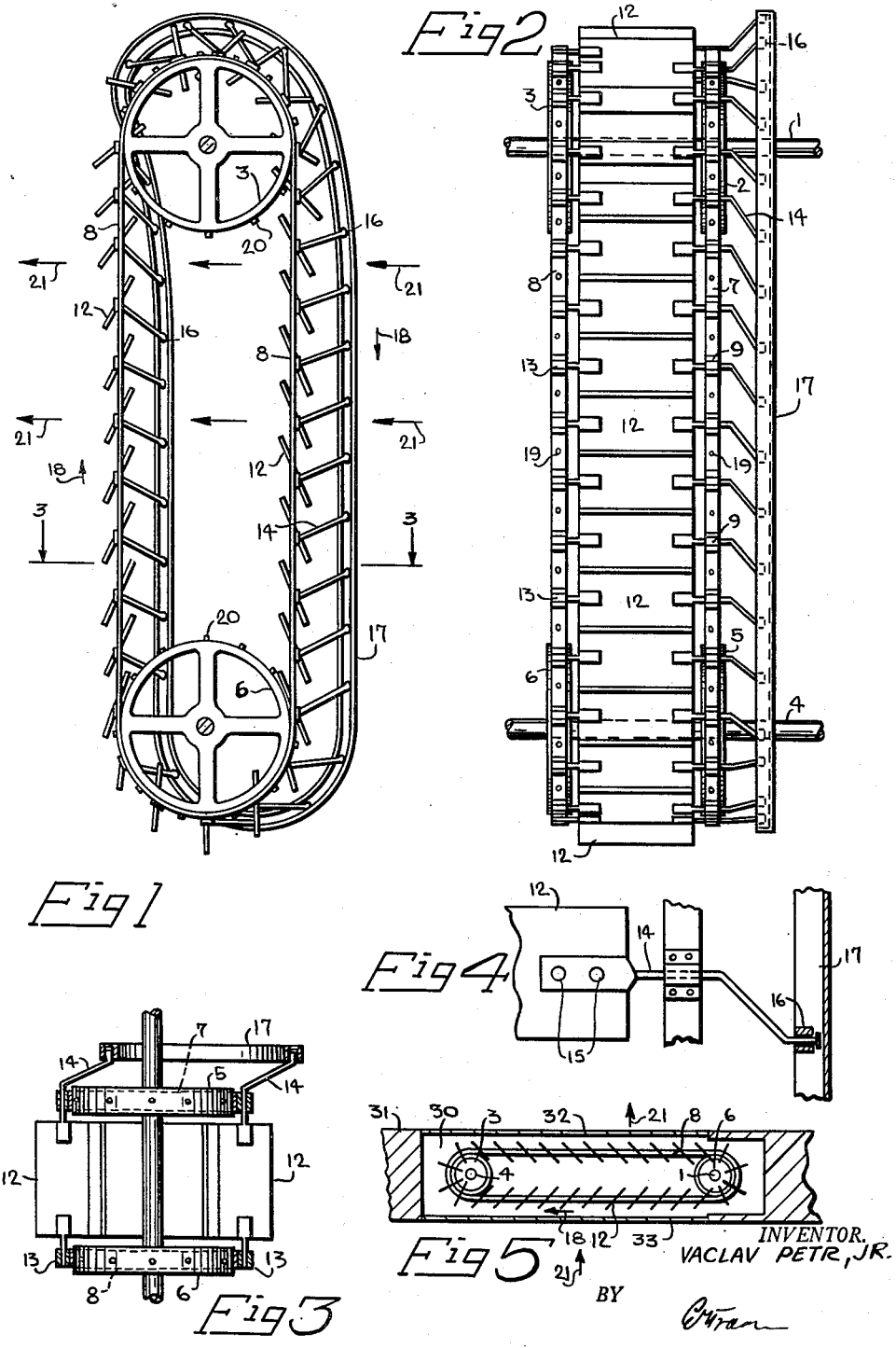

2,548,615

UNITED STATES PATENT OFFICE 2,548,615

BLOWER

Václav Petr, Jr., Brno, Czechoslovakia

Application February 25, 1948, Serial No. 10,830
In Yugoslavia December 3, 1939

6 Claims. (Cl. 230—240)

This invention relates to a blower and particularly to an air blower.

In many branches of industrial activities, for instance, in flour milling plants the necessity arises to remove from the pulverulent masses under treatment undesired components and contaminating substances which have a lighter weight than the masses.

The latter are for this purpose frequently spread on screens which are exposed to air currents generally produced by blowers; these air streams remove the contaminating lighter components.

Difficulties have been encountered when using customary blowers insofar as the air streams do not reach the entire area of the spread materials simultaneously. To remedy this deficiency subsidiary devices were provided which in coaction with the blowers produce a more uniform air current adapted to act on the entire area of the spread masses.

However, a satisfactorily solution of the problem was not obtained because neither a uniform stream direction of the air resulted in this manner nor a uniform air pressure; as a consequence thereof local accumulations were formed in the treated materials of a different thickness preventing a satisfactory and thorough purification.

The above described difficulties caused by the use of customary blowers are particularly noticeable in those cases where the masses to be treated are spread on large size screens; here the cleaning efficiency was reduced in proportion to the length and width of the screens.

It is a primary object of this invention to eliminate these shortcomings and to produce a uniform and unidirectional air flow throughout the entire area of pulverulent spread masses.

It is a further object of the invention to provide a blower which removes from these pulverulent mixtures all the undesired light components and contaminations.

The invention will now be described in detail and with reference to the accompanying drawings.

In the drawings,

Fig. 1 is a vertical sectional view of my novel air blower,

Fig. 2 is a side view thereof,

Fig. 3 is a sectional view on line 3—3 of Fig. 1,

Fig. 4 is a sideview of a constructional detail shown in Fig. 2,

Fig. 5 is a schematic side view of the blower mounted in the recess of a wall screen being provided above and below the blower.

The blower shown in the drawings consists mainly of two endless belts 7, 8 preferably made of steel. The two belts are arranged next to each other. The one belt 7 is carried on two uniform wheels or discs 2, 5 which are rotatably supported on two parallel shafts 1, 4. The adjacent second belt 8 is in the same manner carried on uniform wheels 3, 6 which are supported at the other end of the same shafts; the two shafts 1, 4 are mounted in the two loop ends of the endless belts in any suitable manner and extend through the same plane.

Consecutive rotatable blades 12 are provided between the two belts 7, 8 and supported by the same. For this purpose bearings 9 are fastened to one side of steel belt 7 at an equal distance; shafts 10 are rotatably mounted in these bearings at the one end and connected with the blades 12 at the other end. Similar bearings 13 are fastened to the second belt 8; shafts 14 rotatably carried in these bearings are connected at the one end with the blades 12 by screws 15. These shafts 14 are cranked and provided at the opposite end with rollers 16. A guide rail 17 having approximately the shape of the endless belts is located in adjacent relationship to belt 8. The guide rail has a U-shaped cross section.

During the operation of the blower and the travel of belt 8 the rollers 16 rotate and are guided in the U-shaped channel of guide rail 17.

To propel the belts 7, 8 over the wheels the latter are provided with projections 20 which cooperate with orifices 19 in the belts.

The blower is operated in the following manner.

If the wheels 2, 3 are rotated on shaft 1 and wheels 5, 6 rotated on shaft 4 in the direction indicated by arrow 18 the belts 7, 8 are transported in the same direction. Since the ends of the cranked shafts 14 pass through the U-shaped channel of guide rail 17 by means of rollers 16 in the direction of arrow 18 and in the same direction as the bands 7, 8 the blades 12 which are inclined at an acute angle relative to the longitudinal extension of the belts or their traveling direction will reverse their inclination, when they pass over the wheels, then travel with this inclination until they pass over the second pair of wheels where they regain the former inclination.

If in using large blowers and long belts the distance between the wheels must be accordingly enlarged, the belts may be provided with guide discs to prevent longitudinal oscillation and to secure the proper inclination of the blades 12.

The operation of this air blower is schematically shown in Fig. 5, where the blower is mounted in a recess 30 of a wall 31 or any other suitable support and provided with a screen 32 at the one side and a screen 33 at the other side.

By passage of the blades 12 in the direction of arrow 18 the air is sucked into the blower through the blades located on the one side thereof in the direction of arrows 21; it is then transported through the blower and forced out from the same by the blades traveling on the other side of the blower with the opposite inclination.

In this manner a unidirectional air current is produced which removes the lighter components from the masses located on screen 33, which are then expelled through screen 32 in the direction of arrows 21.

The size of the screens is dependent on the length of the blower.

It may be advisable to slightly extend the wall 31 over the one end portion of the blower which is the right end side in Figure 5.

The blower constructed in conformity with this invention has been described in its application to the uniform removal from large areas; however, its use is by no means restricted thereto; it may, for instance, be also used for the ventilation of large spaces, such as concert, theatre and similar large halls.

What I claim is:

1. A fan comprising two endless bands, adjacently located supports for said bands and means to uniformly move said bands over said supports, successive blades located between and rotatably carried by said two bands, a guide rail located in adjacent relationship to at least one band, cranked shafts rotatably carried by said band and said rail and connecting said blades and said guide rail whereby the blades during the travel of said bands are inclined by said guide rail in such a manner that the air is unidirectionally sucked into the fan at its one side and forced from the same by the blades at the opposite side.

2. A fan comprising two endless bands, two adjacently located discs to support the looped end portions of said bands and means to uniformly move said bands over said discs, successive blades located between and rotatably carried by said two bands, a guide rail located in adjacent relationship to one band, cranked shafts rotatably carried by said band and connecting said blades and said guide rail whereby the blades during the travel of said bands are turned from an inclined air sucking position into an oppositely inclined air expelling position.

3. A fan comprising two endless bands, two adjacently located discs supporting the looped end portions of said bands, two parallel shafts located in these terminal loop portions and extending through the same plane to rotatably support said pair of discs, equidistant orifices in said bands and corresponding projections at the circumference of said discs to uniformly propel said two bands over said discs, successive blades located between and rotatably carried by said two bands, a guide rail located in adjacent relationship to one band, cranked shafts rotatably carried by said band and connecting said blades and said guide rail whereby the blades during the travel of said blades are turned from an inclined air sucking position into an oppositely inclined air expelling position.

4. A fan comprising two endless bands, supports adjacently located in the terminal loops of said bands to form two side portions thereof and means to uniformly move said bands over said supports, successive equidistant rotatable blades located between said two bands, bearings carried by said bands, a bearing guide rail located in adjacent relationship to at least one band, cranked shafts rotatably supported by said bearing guide rail, said shafts being fastened to said blades and rotatably connected with said guide rail whereby the blades during the travel of said bands are turned from an inclined air sucking position into an oppositely inclined air expelling position.

5. A fan comprising two adjacent uniform endless bands, means to adjacently support said bands to form two side portions thereof and to uniformly move the same over said supports, consecutive equidistant blades located between said bands and rotatably connected therewith, a guide rail having the approximate shape of said endless bands located in adjacent relationship to one of them, a number of bearings equal to the number of the blades mounted on each of said two bands, shafts rotatably located at the one end in the bearings of one band and fastened to said blades at their other end, cranked shafts rotatably located in the bearings of the other band fastened to said blades at the one end and extending into rotative connection with said guide rail at the other end whereby the blades during the travel of said bands are turned from an inclined air sucking position into an oppositely inclined air expelling position.

6. A fan comprising two adjacent uniform endless bands, two adjacently located discs supporting the loop portions of said bands and means to uniformly move the bands over said discs, consecutive equidistant blades located between said bands and rotatably connected therewith, a U-shaped guide rail having the approximate shape of said endless bands located in adjacent relationship to one of them, a number of bearings equal to the number of the blades mounted on each of said two bands, shafts rotatably located at the inner end in the bearings of one band and fastened to said blades at their outer end, cranked shafts rotatably located with the inner end in the bearings of the other band fastened to said blades and provided with rollers at the other end, said rollers extending into operative connection with said U-shaped guide rail whereby the blades during the travel of said bands are turned from an inclined air sucking position into an oppositely inclined air expelling position.

VÁCLAV PETR, Jr.

REFERENCES CITED

The following references are of record in the file of this patent:

UNITED STATES PATENTS

| Number | Name | Date |
|---|---|---|
| 381,625 | Johnston | Apr. 24, 1888 |

FOREIGN PATENTS

| Number | Country | Date |
|---|---|---|
| 264,732 | Italy | May 8, 1929 |